United States Patent
Morita

(10) Patent No.: US 7,742,169 B2
(45) Date of Patent: Jun. 22, 2010

(54) HIGH-SPEED POLARIZING DEVICE AND HIGH-SPEED BIREFRINGENCE MEASURING APPARATUS AND STEREOSCOPIC IMAGE DISPLAY APPARATUS UTILIZING THE POLARIZING DEVICE

(75) Inventor: Masato Morita, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 411 days.

(21) Appl. No.: 11/822,294

(22) Filed: Jul. 3, 2007

(65) Prior Publication Data
US 2008/0002201 A1 Jan. 3, 2008

(30) Foreign Application Priority Data
Jul. 3, 2006 (JP) ............................. 2006-183348

(51) Int. Cl.
*G01J 4/00* (2006.01)
(52) U.S. Cl. ...................................... 356/369; 356/364
(58) Field of Classification Search ......... 356/364–369; 348/756, 744, 757, 679, 782; 353/20, 8, 353/31, 34, 37, 97; 359/487, 495, 496, 497, 359/618, 250, 251, 253, 256, 246, 237, 247
See application file for complete search history.

(56) References Cited

U.S. PATENT DOCUMENTS
7,170,567 B2 * 1/2007 Ouchi et al. ................ 348/750

FOREIGN PATENT DOCUMENTS
JP 2004-294370 A 10/2004

* cited by examiner

Primary Examiner—Gregory J Toatley, Jr.
Assistant Examiner—Tri T Ton
(74) Attorney, Agent, or Firm—Buchanan Ingersoll & Rooney PC

(57) ABSTRACT

A polarizing device including a plurality of polarized light radiating units for radiating polarized light rays each of which is polarized in a particular direction, a rotary reflector for receiving light rays emitted by the plurality of polarized light radiating units while being rotated and for outputting reflected light in a certain direction, and an analyzer disposed midway an optical path of the reflected light from the rotary reflector to set a polarization direction of the reflected light in a certain direction, wherein each of the polarized light radiating units includes a light source, a polarizer for setting a polarization direction of light from the light source, and a first compensator for compensating for a change in a state of polarization attributable to the rotary reflector, and the plurality of polarized light radiating units are disposed in a radial arrangement that is centered at the rotary reflector.

5 Claims, 10 Drawing Sheets

HIGH-SPEED POLARIZING DEVICE AND HIGH-SPEED BIREFRINGENCE MEASURING APPARATUS AND STEREOSCOPIC IMAGE DISPLAY APPARATUS UTILIZING THE POLARIZING DEVICE

FIELD OF THE INVENTION

The present invention relates to a high-speed polarizing device for switching the polarization direction of light from a light source at a high speed, a high-speed birefringence measuring apparatus which varies the polarization direction of light radiated to a sample using the high-speed polarizing device and measures the quantity of light output from the sample to measure birefringence characteristics, and a stereoscopic image display apparatus which displays a stereoscopic image utilizing changes in the state of polarization.

BACKGROUND OF THE INVENTION

It has been known that optical characteristics of various optical elements and semiconductor thin film forming processes can be evaluated using an ellipsometer which irradiates an object under measurement with light and measures a state of polarization from light reflected or transmitted by the object under measurement (for example, see JP-A-2004-294370).

There are several methods for measurement using an ellipsometer, including measuring techniques referred to as rotary polarizer method, rotary analyzer method, and rotary compensator method. Those measuring techniques involve the step of rotating a polarizer, an analyzer, and a compensator, respectively, and resultant states of polarization of light entering or exiting those elements are measured. According to any of those techniques, data are acquired at each predetermined angle, a half rotation of the polarizer, analyzer, or compensator serving as one unit of angle. The state of polarization of an object under measurement is calculated from data of the quantity of light measured at each predetermined angle.

The above-mentioned measuring method will now be briefly described.

As exemplified in FIG. 8, a measuring system according to the rotary polarizer method includes a light source 101 such as a semiconductor laser, a polarizer 102 forming linearly polarized light in an arbitrary direction, a sample 103 that is an object under measurement, an analyzer 104, and a light-receiving device 105 for receiving light transmitted through the analyzer 104. The polarizer 102 is accompanied by a rotary mechanism for changing the polarization direction, and the rotary mechanism includes a first pulley 106B secured on an output shaft off a motor 106A and a second pulley 106D which is connected to the first pulley 106B through an endless belt 106C and on which the polarizer 102 is rotatably mounted. Light from the light source 101 passes through the polarizer 102 and impinges upon the sample 103, and light transmitted by the sample 103 is measured by the light-receiving device 105 through the analyzer 104. The polarization direction of the polarizer 102 is varied by rotating the polarizer with the motor 106A to vary the polarization direction of light incident on the sample 103. As a result, the amount of transmitted light in each polarization direction is identified by the light-receiving device 105, which makes it possible to measure polarization characteristics of the sample 103.

As exemplified in FIG. 9, a measuring system according to the rotary analyzer method includes a light source 101 such as a semiconductor laser, a polarizer 102 forming linearly polarized light in a particular direction, a sample 103, an analyzer 104 forming linearly polarized light in an arbitrary direction, and a light-receiving device 105 for receiving light transmitted through the analyzer 104. This configuration provides a measuring system in which the rotary mechanism accompanying the polarizer 102 shown in FIG. 8 is provided on the analyzer 104 instead of the polarizer 102. In this system, light transmitted through the sample 103 is split into components in some polarization directions to measure the state of polarization.

According to the rotary compensator method, as exemplified in FIG. 10A, a measuring system includes a light source 10 such as a semiconductor laser, a polarizer 102 forming linearly polarized light in a particular direction, a sample 103, an analyzer 104 for detecting the state of polarization, and a light-receiving device 105 for receiving light transmitted through the analyzer 104. The measuring system further includes a compensator 107 which is rotatably supported midway the optical path between the polarizer 102 and the sample 103. The compensator 107 is driven for rotation by a rotary mechanism as shown in FIG. 8, and the state of polarization of light radiated to the sample is varied accordingly. At this time, the state of polarization of light transmitted through the sample 103 varies as the compensator 107 is rotated, and polarization characteristics of the sample 103 are measured by detecting the state of polarization at the light-receiving device 105 through the analyzer 104. According to the rotary compensator method, as shown in FIG. 10B, a measuring system may alternatively be provided, in which the compensator 107 is provided midway the optical path between the sample 103 and the analyzer 104.

SUMMARY OF THE INVENTION

When a state of polarization is measured using the above-described techniques, in any case, the state of polarization of the polarizer 102, the analyzer 104, or the compensator 107 is varied by the rotary operation of the motor 106A. When it is intended to perform an operation of measuring a state of polarization at a high speed, the rotating speed of the motor 106A constitutes a rate-limiting factor. Therefore, the speed of measurement of a state of polarization cannot be set higher than the maximum rotating speed of the motor, and a limit has been placed on efforts toward higher measuring speeds even if a difference (an increase) in the rotating speed achievable with a power transmission mechanism is taken into consideration. As a result, a great amount of time has been required for measurement of a large area. Further, when measurement is conducted on an object which undergoes state changes in a short time, problems have arisen including the impossibility of measuring such state changes in a short time attributable to measuring intervals which cannot be made shorter.

Demand for mechanisms for changing a state of polarization at a high speed is not limited to apparatus for measuring optical characteristics as described above. Demand for the function of switching a polarization direction has existed in other fields such as the field of displays for displaying three-dimensional images, and higher switching speeds have been needed in such fields.

The invention was made taking the above-described situation into consideration, and it is an object of the invention to provide a high-speed polarizing apparatus capable of switching a state of polarization at a high speed and a polarization measuring apparatus and a display utilizing the same.

The above-described objects of the invention are achieved by configurations as described below.

(1) A high-speed polarizing device for continuously generating light rays in different states of polarization, characterized in that it includes:
- a plurality of polarized light radiating units for radiating polarized light rays each of which is polarized in a particular direction;
- a rotary reflector for receiving light rays emitted by the plurality of polarized light radiating units while being rotated and for outputting reflected light in a certain predetermined direction; and
- an analyzer disposed midway the optical path of the reflected light from the rotary reflector to set the polarization direction of the reflected light in a certain predetermined direction, and in that:
- each of the polarized light radiating units includes a light source, a polarizer for setting the polarization direction of light from the light source, and a first compensator for compensating for a change in the state of polarization attributable to the rotary reflector; and
- the plurality of polarized light radiating units are disposed in a radial arrangement that is centered at the rotary reflector.

In the high-speed polarizing device, light rays emitted by the plurality of polarized light radiating units are switched by the rotary reflector, which allows states of polarization to be switched at a high speed.

(2) A high-speed polarizing device according to the item (1) characterized in that each of the plurality of polarized light radiating units includes a polarizer, the polarization direction of the polarizer being different between the polarized light radiating units.

In this high-speed polarizing device, since each of the polarized light radiating units includes a polarizer having a polarization direction different from others, the polarized light radiating units can generate polarized light rays having different polarization directions.

(3) A high-speed polarizing device according to the item (1), characterized in that each of the plurality of polarized light radiating units includes a polarizer having a polarization direction which is a certain predetermined direction and a second compensator, the retardation of the compensator being different between the polarized light radiating units.

In this high-speed polarizing device, since each of the polarized light radiating units includes a second compensator having a retardation different from others, the polarized light radiating units can generate polarized light rays in different states of polarization.

(4) A high-speed polarizing device for continuously generating light rays in different states of polarization, characterized in that it includes:
- a light source;
- a polarizer for setting the polarization direction of light emitted from the light source in a certain predetermined direction;
- a rotary reflector for receiving light emitted from the polarizer while being driven for rotation and for outputting reflected light in a predetermined direction; and
- a plurality of polarization direction splitting units each receiving the reflected light from the rotary reflector and setting the light in a particular polarization direction, and in that:
- each of the polarization direction splitting units includes a first compensator for compensating for a change in the state of polarization attributable to the rotary reflector; and
- the plurality of polarization direction splitting units are disposed in a radial arrangement that is centered at the rotary reflector.

In this high-speed polarizing device, the plurality of polarization direction splitting unit allows output light from a sample to be obtained in each polarization direction, which makes it possible to measure a state of polarization at a high speed.

(5) A high-speed polarizing device according to the item (4), characterized in that each of the plurality of polarization direction splitting units includes an analyzer, the polarization direction of the analyzer being different between the polarization direction splitting units.

In this high-speed polarizing device, since each of the polarization direction splitting units includes an analyzer having a polarization direction different from others, the polarization direction splitting units can split the light in different polarizing directions.

(6) A high-speed polarizing device according to the item (4), characterized in that each of the plurality of polarization direction splitting units includes an analyzer having a predetermined polarization direction and a second compensator, the retardation of the second compensator being different between the polarization direction splitting units.

In this high-speed polarizing device, since each of the polarization direction splitting units includes a second compensator having a retardation different from others, the polarization direction splitting units can split light in different polarization directions.

(7) A high-speed birefringence measuring apparatus characterized in that it includes:
- a high-speed polarizing device according to any of the items (1) to (3); and
- a light-receiving device for receiving light output from the analyzer, wherein polarization characteristics at a sample disposed midway the optical path from the rotary reflector to the analyzer are measured based on a received light quantity obtained by the light-receiving device.

In this high-speed polarizing device, the polarized light radiating units can switch polarizing directions at a high speed. As a result, when birefringence characteristics of a sample are analyzed, the measurement can be carried out at a high speed even if the sample has a large area. Even in the case of measurement of an object which undergoes state changes in a short time, measuring intervals can be made shorter to allow state changes in a short time to be accurately measured.

(8) A high-speed birefringence measuring apparatus characterized in that it includes:
- a high-speed polarizing device according to any of the items (4) to (6); and
- a plurality of light-receiving devices, provided in associated with the polarization direction splitting units, for receiving light output by the analyzer and the second compensator, wherein polarization characteristics of a sample disposed midway the optical path from the rotary reflector to the analyzer are measured based on a received light quantity obtained by the light-receiving device.

In this high-speed polarizing device, the polarization direction splitting units can switch polarizing directions at a high speed. As a result, when birefringence characteristics of a sample are analyzed, the measurement can be carried out at a high speed even if the sample has a large area. Even in the case of measurement of an object which undergoes state changes in a short time, measuring intervals can be made shorter to allow state changes in a short time to be accurately measured.

(9) A stereoscopic image display apparatus characterized in that it includes:
polarized light emitting unit for repeatedly emitting light rays having polarization directions orthogonal to each other using a high-speed polarizing device according to any of the items (1) to (3);
polarization display unit capable of changing the polarization directions throughout a display screen;
image signal supplying unit for supplying a parallax image signal for right eye and a parallax image signal for left eye to the polarization display unit in synchronism with a change in the polarization direction of light emitted from the polarized light emitting unit to cause the polarization display unit to display an image; and
an eyepiece having a polarizing film for right eye and a polarizing film for left eye having polarization directions orthogonal to each other.

Since the high-speed polarizing device allows polarization directions to be switched at a high speed, contents displayed can be changed at a high speed, which makes it possible to provide a stereoscopic image display function with higher quality.

The invention provides a high-speed polarizing device capable of switching polarization directions at a high speed. When the device is used in a birefringence measuring apparatus, measurement can be carried out at a high speed even in the case of an object having a large area. Even in the case of measurement of an object which undergoes state changes in a short time, measuring intervals can be made shorter to allow state changes in a short time to be accurately measured. When the high-speed polarizing device is used to switch states of polarization in displaying three-dimensional images, since polarization directions can be switched at a high speed, a stereoscopic image display function with higher quality can be provided.

DESCRIPTION OF REFERENCE NUMERALS AND SIGNS

Figure 1:
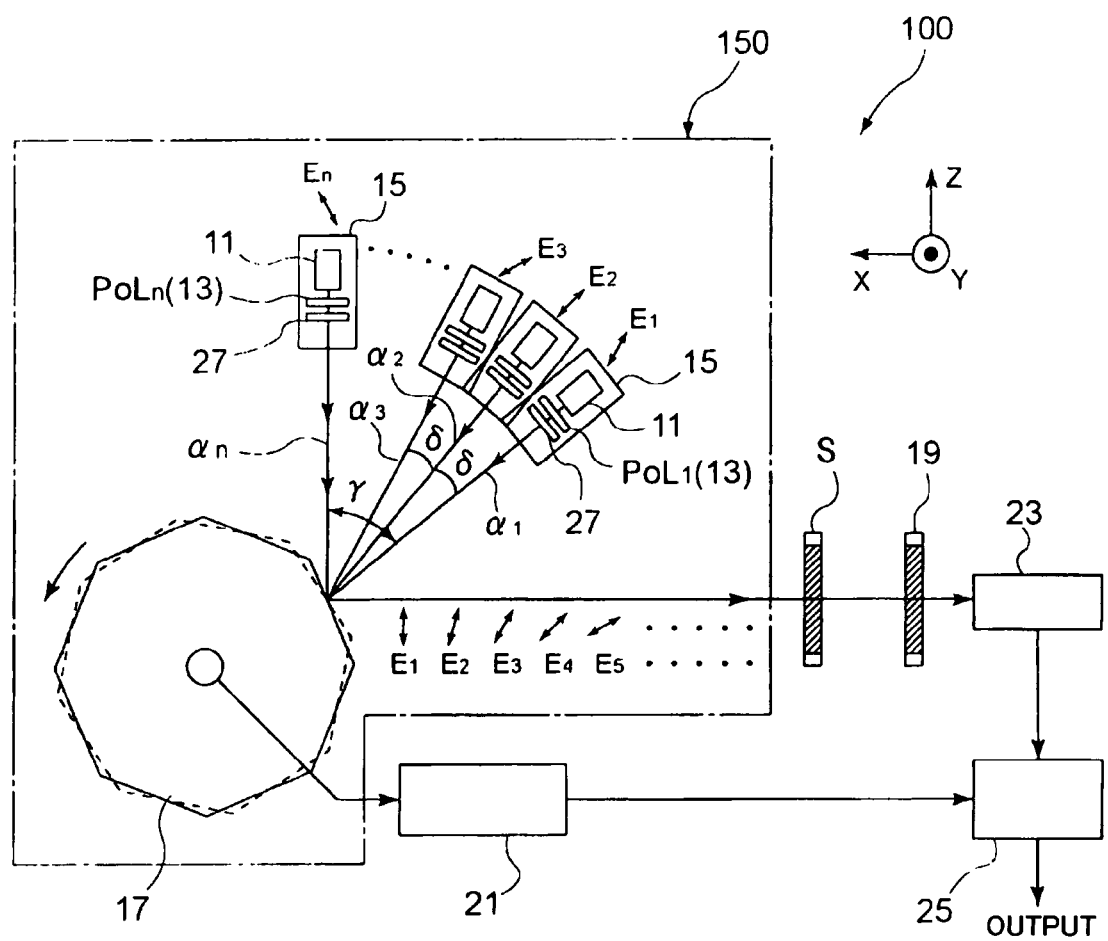
FIG. 1 is a block diagram showing a high-speed polarizing device in a first mode for carrying out the invention and a birefringence measuring apparatus utilizing the same.

11: light source
13: polarizer ($POL_1$ to $POL_n$)
15: polarized light radiating unit
17: polygon mirror (rotary reflector)
19: analyzer
21: rotation detecting unit
23: light-receiving device
25: control unit
27: first compensator
31: light source
33: polarizer
35, 36: polarization direction splitting unit
37: analyzer ($ANA_1$ to $ANA_n$)
39: light-receiving device
41: polarizer
43: second compensator ($COM_1$ to $COM_n$)
53: display
55: surface illumination light-transforming unit
57, 58: glass substrate
59, 60: transparent electrode layer
62R: polarizing film for right eye
62L: polarizing film for left eye
100, 200, 300, 400: birefringence measuring apparatus
150, 250, 350, 450: high-speed polarizing device
500: stereoscopic image display apparatus
510: polarized light emitting unit
520: polarization display unit
530: image signal supplying unit
540: eyepiece

DETAILED DESCRIPTION OF THE INVENTION

Modes for carrying out the invention will now be described in detail with reference to the accompanying drawings.

(First Mode for Carrying Out the Invention)

FIG. 1 is a block diagram showing a high-speed polarizing device according to a first mode for carrying out the invention and a birefringence measuring apparatus utilizing the same.

A high-speed polarizing device 150 is a device for continuously generating light rays having different polarization directions. The device includes a plurality of polarized light radiating units 15 having light sources 11 and polarizers 13 each of which sets the polarization direction of light from the light source 11 in a particular direction, a polygon mirror (rotary reflector) 17 for receiving light rays emitted by the radiating units 15 while being rotated and for outputting reflected light in a certain predetermined direction, and an analyzer 19 disposed midway the optical path of the reflected light from the polygon mirror 17 to set the polarization direction of the reflected light in a certain predetermined direction. A birefringence measuring apparatus 100 utilizing the high-speed polarizing device 150 further includes a rotation detecting unit 21 for detecting and outputting a rotation angle signal from the polygon mirror 17 which is rotating, a light-receiving device 23 for receiving light output from the analyzer 19, and a control unit 25 for controlling various parts including the polygon mirror 17. The apparatus measures polarization characteristics of a sample S disposed midway the optical path from the polygon mirror 17 to the analyzer 19 based on the quantity of light obtained by the light-receiving device 23.

The birefringence measuring apparatus 100 measures optical characteristics based on the rotary polarizer method.

The polarized light radiating units 15 are disposed in a radial arrangement that is centered at the polygon mirror 17. In the present mode for carrying out the invention, the units are disposed on an arc with their optical axes α1 to αn inclined. Each of the polarized light radiating units 15 includes a first compensator 27 for compensating a change in the state of polarization attributable to the polygon mirror 17. In the present mode for carrying out the invention, a wave plate (e.g. a λ/4 plate) is used as the first compensator 27, and a change in the state of polarization caused by reflection at the polygon mirror 17 is compensated by adjusting the in-plane angle of the compensator. The first compensator 27 is rotatably supported and secured at a proper angle through an adjustment which will be described later.

Each of the light sources 11 provided at the polarized light radiating units 15 is constituted by a semiconductor laser (LD) emitting coherent light having the same intrinsic wavelength (λ), a light-emitting diode (LED) emitting light in an intrinsic waveband, or a lamp which may be of various types. When a lamp is used, in order to extract light having an intrinsic wavelength selectively, a color filter or interference filter is preferably disposed on the optical path immediately behind the lamp, and a collimator is preferably provided to obtain parallel light.

Figure 2:
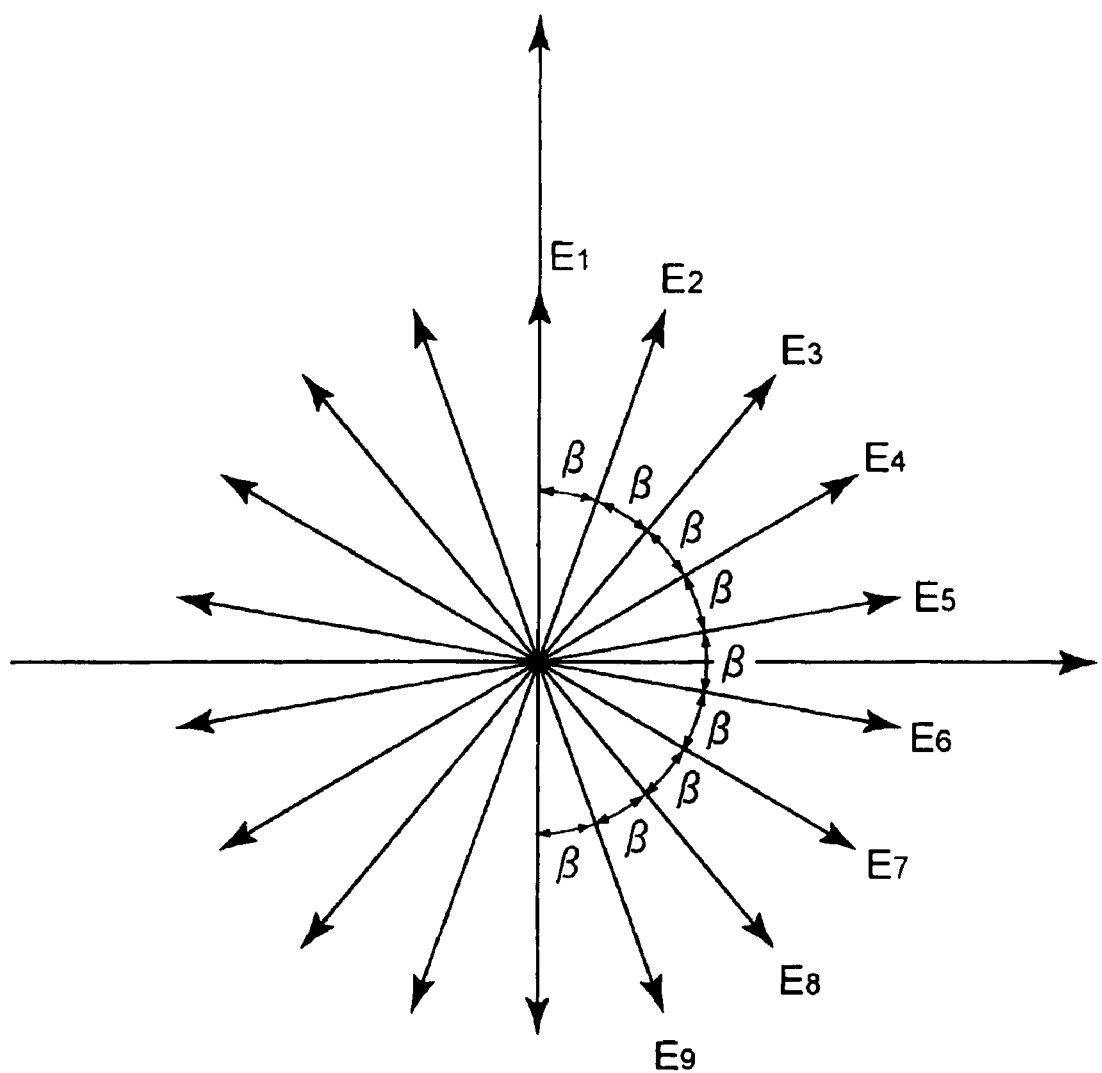
FIG. 2 illustrates the angle of polarization of each inspection light ray.

The polarizers 13 form the light from the light source 11 into linearly polarized light in a certain predetermined direction. In the present mode for carrying out the invention, the polarizers comprise a first polarizer $POL_1$ to an n-th polarizer $POL_n$. The polarizers $POL_1$ to $POL_n$ are set to generate linearly polarized light rays which are sequentially shifted clockwise from each other at a predetermined fixed angle (β) in a plane that is perpendicular to their respective optical axes α1 to αn, as shown in FIG. 2. Thus, the directions of the linearly polarized light rays from the polarized light radiating units 15 are set at equal intervals so as to cover a range of 0 to 180°. That is, linearly polarized light rays E1 to $E_n$ which have been transmitted through the respective polarizers 13 are adjusted such that they have polarization directions shifted from each other at the equal angle β. The angle β is in the range from 5° to 90° and, preferably, in the range from 10° to 60°. The angle is most preferably at 20° to define nine directions from the viewpoint of space efficiency and accuracy of measurement.

The first compensator 27 compensates for a change in the state of polarization caused by reflection at the polygon mirror 17. In other words, a change in the state of polarization caused by reflection at the polygon mirror 17 is identified in advance, and an optical compensation capability to cancel such a change is provided. Referring to the adjustment of the in-plane angle of the first compensator 27, the sample S is removed from the optical path; the angle of the polygon mirror 17 is set at an angle at which light from a particular light source directly impinges upon the analyzer 19; light output from the analyzer 19 is measured at the light-receiving device 23; and the angle of the first compensator 27 is adjusted such that the light incident upon the analyzer 19 becomes linearly polarized light whose direction agrees with that of the polarizer 13 disposed immediately behind the light source 11. Such adjustment is similarly carried out on each polarized light radiating unit 15.

The first compensator 27 of the present mode for carrying out the invention is provided for each polarized light radiating unit 15 and disposed on the optical path between the polarizer 13 and the polygon mirror 17. The invention is not limited to such an arrangement, and the first compensator 27 may alternatively be disposed, for example, on the optical path between the polygon mirror 17 and the sample S. In this case, the first compensators 27 are adjusted at a high speed in synchronism with the rotation of the polygon mirror 17 so as to compensate for changes in polarization attributable to reflection of light from each unit.

The polygon mirror 17 projects light rays entering the same from a plurality of directions in one particular direction, and it has eight reflecting surfaces constituted by an octagonal pole. The optical members such as the light sources 11 and the first compensators 27 of the polarized light radiating units 15 are set at intervals equally dividing the central angle γ of an arc (scan range) about the polygon mirror 17 such that the optical axes α1 to αn of the optical systems substantially converge at one point on a reflecting surface of the polygon mirror 17. A central angle δ between the optical axes α1 to αn is set to satisfy the following equation.

$$\delta = \gamma/(n-1) = \gamma/n$$

In this mode for carrying out the invention, the polygon mirror 17 is driven by a motor, which is not shown, for rotation at a predetermined fixed speed. In this configuration, linearly polarized light rays which are set at a plurality of steps in association with the polarizers 13 within the range from 0 to 180° (constituting one unit of measurement) impinge on the sample S repeatedly depending on the number of surfaces of the polygon mirror 17. That is, when reflected light exits the polygon mirror 17, the polarization directions in one unit of measurement as described above have been subjected switching that is determined by the rotating speed of the polygon mirror multiplied by the number of surfaces thereof.

Although a polygon mirror 17 is used as a rotary reflector in the present mode for carrying out the invention, the invention is not limited to the same, and other types of reflectors such as a galvano mirror may be used.

The analyzer 19 extracts linearly polarized light components in a particular direction from linearly polarized light having various polarization directions which has transmitted through the sample S, and the analyzer used has a structure similar to that of the above-described polarizer 13.

The light-receiving device 23 detects light from the sample S which has been transmitted through the analyzer 19. In the present mode for carrying out the invention, when the light-receiving device 23 detects a particular component of light which has been transmitted through the analyzer 19, it outputs a detection signal having a magnitude according to the quantity of the incident light to the control unit 25. For example, a light-receiving element such as a photomultiplier or photodiode may be used as the light-receiving device 23.

The control unit 25 analyzes birefringence characteristics of the sample S by identifying the state of polarization of the linearly polarized light rays $E_1$ to $E_n$ at the part of the sample S where the linearly polarized light is transmitted from data based on the azimuth angles (β) of the linearly polarized light identified from a rotation portion signal supplied by the rotation detecting unit 21 and the output signal from the light-receiving device 23 at the respective timing.

In the above configuration, reflected light from the polygon mirror 17 impinges upon the sample S. When it is desired to analyze the entire surface of the sample S, a two-dimensional moving mechanism is additionally provided to scan the sample with the irradiated region shifted sequentially while moving the sample S and the optical systems relative to each other, for example, in the direction of a Y-Z plane. In the present mode for carrying out the invention, a configuration is employed, in which linearly polarized light radiated to the sample S is transmitted through the sample S. An alternative configuration may be employed, in which the radiated linearly polarized light is reflected and measurement is conducted on the reflected light. Such a design change may be similarly made in the configurations of the following modes for carrying out the invention.

The effects of the birefringence measuring apparatus having the above-described configuration will now be described.

Light rays (inspection light) emitted from the light sources 11 of the polarized light radiating units 15 are converted by the polarizers 13 ($POL_1$ to $POL_n$) into linearly polarized light rays in azimuth angles different from each other, and the light rays impinge upon the first compensators 27 to be subjected to such an optical effect that the influence of reflection at the polygon mirror 17 is cancelled (compensated) in advance. Thereafter, the state of polarization of the inspection light changes when the light is reflected by the polygon mirror 17. However, since compensation for such a change has already been provided by the first compensator 27, after the inspection light rays are reflected by the polygon mirror 17, the light rays return to the same azimuth angles they had immediately after transmission through the polarizers 13.

Next, the inspection light rays reflected by the polygon mirror 17 impinge upon the analyzer 19 after being transmitted through the sample S. Then, only linearly polarized light rays (components) in the state of polarization which agrees with an azimuth angle set by the analyzer 19 are allowed to pass, and the light rays impinge upon the light-receiving device 23. The light which has thus impinged upon the light-receiving device 23 results in the output of a detection signal in accordance with the quantity of the incident light. When the detection signal is input to the control unit 25, the control unit 25 analyzes birefringence at the irradiated part of the sample S according to the above analysis equation (1), the rotation position signal from the rotation detecting unit 21 being reflected in the analysis.

In the present mode for carrying out the invention, light rays from the light sources 11 are adjusted by the first polarizer $POL_1$ to the n-th polarizer $POL_n$ such that they are polarized to have azimuth angles slightly different from each other. The inspection light rays which have been compensated by the first compensators 27 for their states of polarization sequentially impinge upon the polygon mirror 17 and are reflected toward the sample S. Therefore, the inspection light rays ($E_1$ to $E_n$) impinge upon the sample S while being switched at a high speed as linearly polarized light rays which have respective polarization directions different from each other by the angle β and which are equally spaced to cover one unit of measurement that is the range of 0 to 180°. The state of polarization of the inspection light rays incident upon the sample S is changed depending on the birefringence of the sample S at the irradiated part thereof.

As a result, after passing through the sample S, the inspection light rays are under the influence of the birefringence of the sample S. Only components of the light rays having a particular polarization direction are allowed to pass through the analyzer 19 provided immediately behind the sample S in the optical path to enter the light-receiving device 23. Thus, the quantity of light detected by the light-receiving device 23 changes with time in accordance with the rotation of the polygon mirror 17. Based on the detection signal from the device and the rotation portion signal from the rotation detecting unit 21, the control unit 25 can analyze optical characteristics and optical properties of the sample S in the part thereof irradiated with the inspection light.

As thus described, in the rotary polarizer type birefringence measuring apparatus 100 of the present mode for carrying out the invention, polarization directions can be switched at improved speed according to the rotating speed and the number of surfaces of the polygon mirror 17. It is therefore possible to continuously acquire a detection signal from the light-receiving device 23 in each polarization direction with the polarization directions switched at a high speed.

As a result, the speed of measurement is improved, and it is possible to measure a region under measurement having a large surface area in a short time and to measure an object which undergoes state changes at a high speed at minute timing. Thus, the accuracy of measurement and the reliability of measurement results can be improved.

(Second Mode for Carrying Out the Invention)

A second mode for carrying out the invention will now be described. In the following description of the modes for carrying out the invention, parts having the same functions as those in the first mode for carrying out the invention are indicated by like reference numerals and description will be omitted or simplified for such parts.

Figure 3:
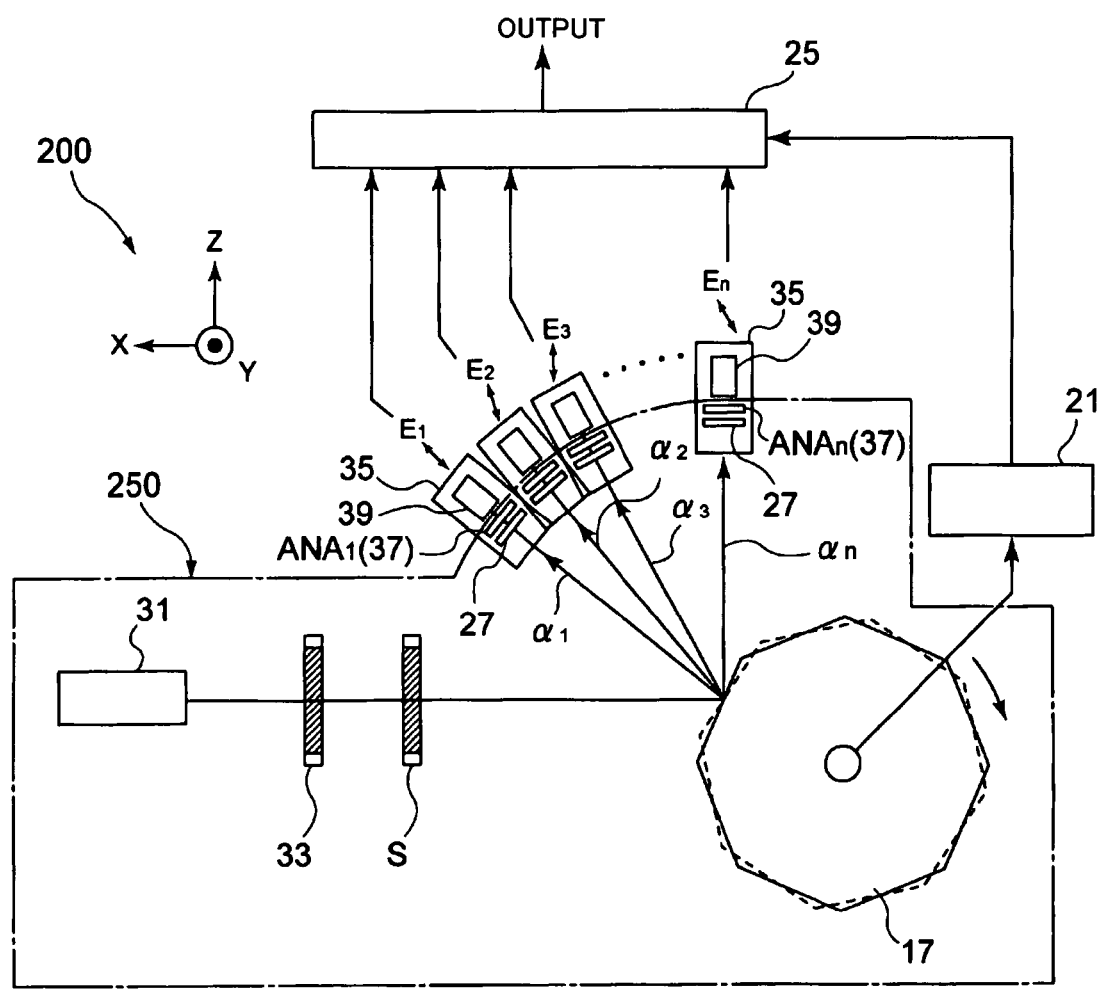
FIG. 3 is a block diagram showing a high-speed polarizing device and a birefringence measuring apparatus in a second mode for carrying out the invention.

FIG. 3 is a block diagram showing a high-speed polarizing device and a birefringence measuring apparatus according to the present mode for carrying out the invention. A high-speed polarizing device 250 and a birefringence measuring apparatus 200 of the present mode for carrying out the invention are different from the high-speed polarizing device 150 and the birefringence measuring apparatus 100 in the first mode for carrying out the invention in the following point. The sample S in the first mode for carrying out the invention is irradiated with inspection light from the plurality of polarized light radiating units 15. On the contrary, the present mode for carrying out the invention employs measurement based on the rotary analyzer method in that a sample S is irradiated with incident light coming from a single optical path and in that light transmitted through the sample S is split into a plurality of optical paths and is detected in each optical path.

The high-speed polarizing device 250 of the present mode for carrying out the invention includes a single light source 31, a polarizer 33 on which light from the light source 31 impinges and which emits linearly polarized light (inspection light) in a certain predetermined direction, a polygon mirror 17 which is a rotary reflection mirror to which the inspection light from the polarizer 33 is introduced after being transmitted through a sample S, and a plurality of polarization direction splitting units 35 which receive reflected light from the polygon mirror 17 and each of which changes the polarization direction into a particular direction. The polarization direction splitting units 35 are disposed in a radial arrangement that is centered at the polygon mirror 17. The units include a first compensator 27 for compensating a change in the state of polarization caused by the polygon mirror 17, an analyzer 37, and a light-receiving device 39 for receiving light output by the analyzer 37, the polarization direction of the analyzer being different between the polarization direction splitting units 35.

The birefringence measuring apparatus 200 utilizing the high-speed polarizing device 250 is similar to the above-described apparatus in that it includes a rotation detecting unit 21 for detecting and outputting a rotation angle signal from the polygon mirror 17 which is rotating and a control unit 25 for controlling various parts including the polygon mirror 17. The apparatus measures polarization characteristics of a sample S disposed midway the optical path from the polarizer 33 to the polygon mirror 17 based on the quantity of light obtained by the light-receiving devices 39.

In the present mode for carrying out the invention, the analyzers 37 comprise a first analyzer $ANA_1$ to an n-th analyzer $ANA_n$. The analyzers $ANA_1$ to $ANA_n$ are set to generate linearly polarized light rays which are sequentially shifted clockwise from each other at a predetermined fixed angle (β) in a plane that is perpendicular to their respective optical axes α1 to αn, in a manner similar to that shown in FIG. 2. Thus, the polarization direction of reflected light from the polygon mirror 17 is split by the polarization direction splitting units 35 into components which are set at equal intervals so as to cover a range of 0 to 180°. That is, in the polarization direction splitting units 35, linearly polarized light rays E1 to $E_n$ which have been transmitted through the respective analyzers 37 have polarization directions shifted from each other at the equal angle β.

A light-receiving device 39 is provided in each of the optical paths $α_1$ to $α_n$, and detection signals from the light-receiving devices 39 of the polarization direction splitting units 35 are output to the control unit 25 to be used for the measurement of polarization characteristics of the sample S in combination with a rotation position signal from a rotation detecting unit 21.

In this mode for carrying out the invention, first compensators 27 for cancelling (compensating) any optical change imparted by reflection at the polygon mirror 17 are also provided in the polarization direction splitting units 35. A wave plate (e.g., a λ/4 plate) is used as the first compensator 27 just as in the first mode for carrying out the invention.

In the above-described configuration, the azimuth angles of polarization components of inspection light which has been transmitted by the sample S can be detected by the first analyzers $ANA_1$ to the n-th analyzer $ANA_n$ of the polarization direction splitting units 35, the analyzers being capable of detecting any azimuth angle of linearly polarized light in the range from 0 to 180°.

The control unit 25 analyzes birefringence characteristics of the sample S by identifying the state of polarization of the linearly polarized light rays $E_1$ to $E_n$ at the part of the sample S where the linearly polarized light is transmitted from data on the azimuth angles (β) of the linearly polarized light rays and the output signals from the light-receiving devices 39 using the analysis equation (1) shown below.

$$I = I_0(1 - \cos2\Psi\cos2A + \sin2\Psi\cos\Delta\sin2A) \quad \text{Equation 1}$$
$$= I_0(1 + S_1\cos2A + S_2\sin2A)$$

where $I_0$ represents the proportion constant of reflected light proportionate to the optical intensity of incident light; A represents the rotational angle of the analyzer; Ψ and Δ represent ellipsometry data; and $S_1$ and $S_2$ represent parameters representing refection of light at the sample.

The effects of the birefringence measuring apparatus having the above-described configuration will now be described.

Inspection light emitted by the light source 31 is converted by the polarizer 33 into linearly polarized light in a particular azimuth angle to impinge upon a part of the sample S. The inspection light transmitted through the sample S impinges upon the polygon mirror 17. The inspection light reflected by the polygon mirror 17 is detected by the polarization direction splitting units 35 which are disposed on the plurality of radial optical paths $α_1$ to $α_n$ at equal angular intervals.

The influence of the reflection at the polygon mirror 17 on the inspection light rays is canceled (compensated) by the first compensators 27 provided in the respective polarization direction splitting units 35. That is, the inspection light rays are maintained in the linearly polarized state without being affected by the reflection at the polygon mirror 17.

Thereafter, only inspection light rays in states of polarization to be allowed to pass through the analyzers 37 or only linearly polarized light components in polarization directions in agreement with azimuth angles set at the analyzers 37 are allowed to pass through the analyzers 37, and the light rays then impinge upon the light-receiving devices 39. The light incident on the light-receiving devices 39 as thus described results in the output of a detection signal in accordance with the quantity of incident light. When the signal is input to the control unit 25, the control unit 25 analyzes the state of birefringence at the irradiated part of the sample S using the above analysis equation (2).

In the present mode for carrying out the invention, inspection light is analyzed at the light-receiving devices 39 at a high speed, which prevents the influence of ambient light and makes it possible to improve the accuracy of measurement. Since only one light source 11 is required, there is no possibility of influence of variations between individual light sources unlike configurations in which a plurality of light sources are required. Although a plurality of light-receiving devices 39 are provided in the present mode for carrying out the invention, the invention is not limited to such a configuration, and a simpler configuration may be provided by employing a line sensor which can collectively receive quantities of light supplied along the plurality of optical axes $α_1$ to $α_n$.

(Third Mode for Carrying Out the Invention)

A high-speed polarizing device and a birefringence apparatus in a third mode for carrying out the invention will now be described.

Figure 4:
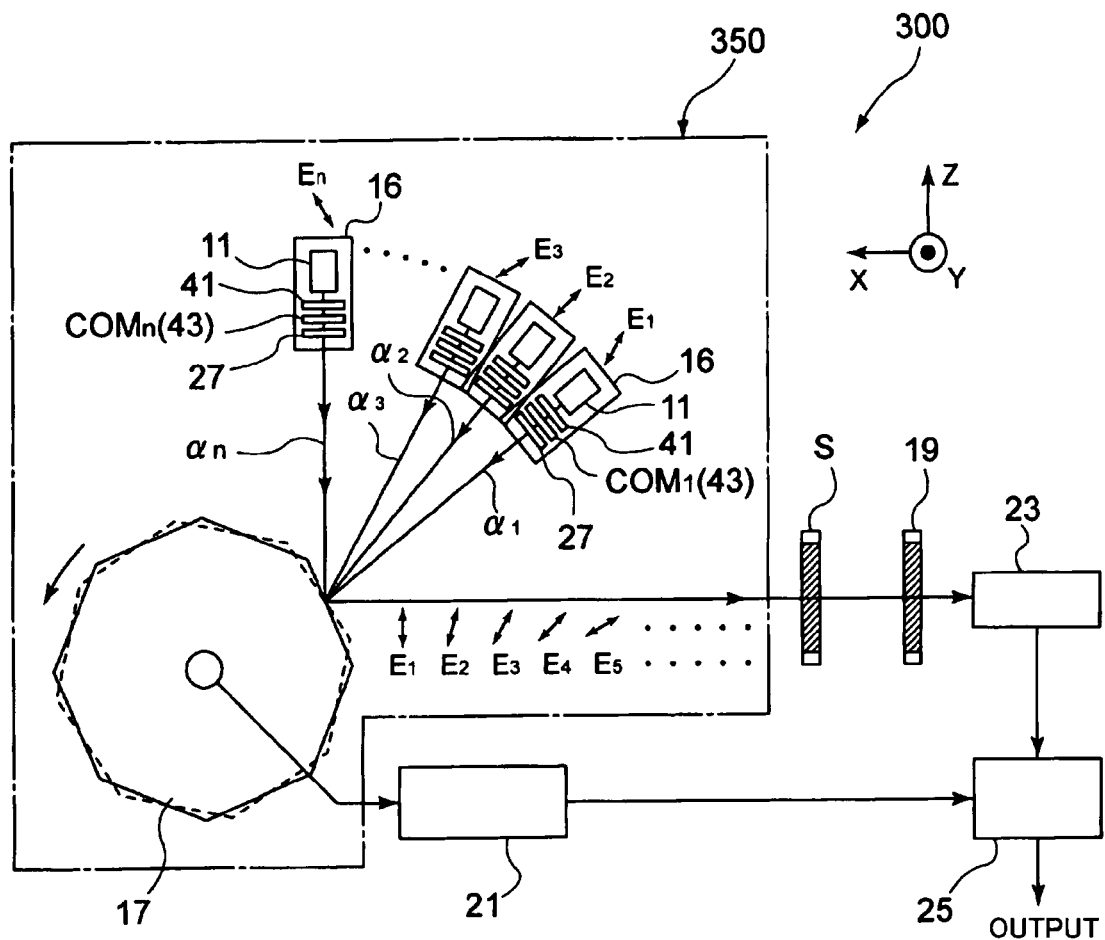
FIG. 4 is a block diagram showing a high-speed polarizing device and a birefringence measuring apparatus in a third mode for carrying out the invention.

FIG. 4 is a block diagram showing a high-speed polarizing device and a birefringence measuring apparatus according to the present mode for carrying out the invention. A high-speed polarizing device 350 of the present mode for carrying out the invention is a device for continuously generating light rays having different polarization directions. The device includes a plurality of polarized light radiating units 16, a polygon mirror 17 for receiving light rays emitted by the plurality of polarized light radiating units 16 while being rotated and for outputting reflected light in a certain predetermined direction, and an analyzer 19 disposed midway the optical path of the reflected light from the polygon mirror 17 to set the polarization direction of the reflected light in a certain predetermined direction. A birefringence measuring apparatus 300 utilizing the high-speed polarizing device 350 further includes a rotation detecting unit 21 for detecting and outputting a rotation angle signal from the polygon mirror 17 which is rotating, a light-receiving device 23 for receiving light output from the analyzer 19, and a control unit 25 for controlling various parts including the polygon mirror 17. The apparatus measures polarization characteristics of a sample S disposed midway the optical path from the polygon mirror 17 to the analyzer 19 based on the quantity of light obtained by the light-receiving device 23.

Each of the polarized light radiation units 16 includes a light source 11. a polarizer 41 for setting the polarization direction of light from the light source 11, and a first compensator 27 for compensating a change in the state of polarization caused by the polygon mirror 17. A plurality of the units is disposed in a radial arrangement centered at the polygon mirror 17.

The polarizer 41 forms linearly polarized light in a certain predetermined direction. That is, the light sources have the same in-plane angle. Second compensators 43 (COM₁ to COMₙ) are disposed between the polarizers 41 and the compensators 27. That is, the present mode for carrying out the invention is configured to measure optical characteristics based on the rotary compensator method. States of polarization are switched stepwise by the second compensators 43.

The second compensators 43 comprise a first compensator $COM_1$ to an n-th compensator $COM_n$, as described above, which are disposed on optical paths α1 to αn. Similarly to the polarizers 13 in the first mode for carrying out the invention, the compensators are set to generate linearly polarized light rays which are sequentially shifted clockwise from each other at a predetermined fixed angle (β) in a plane that is perpendicular to their respective optical axes α1 to αn, in a manner similar to that shown in FIG. 2. Thus, the device is set such that polarized light similar to that obtained by rotating compensators according to the normal rotary compensation method will be obtained immediately before the first compensators 27 of the polarized light radiating unit 16.

The effects of the birefringence measuring apparatus 300 having the above-described configuration will now be described.

Inspection light rays from the light source 11 are transmitted through the polarizers 41 having the same polarization direction to be converted into linearly polarized light rays. Thereafter, the state of polarization of the light rays is adjusted by the first compensator $COM_1$ to the n-th compensator $COM_n$ which are the second compensators 43. Then, the inspection light rays impinge upon the polygon mirror 17, and the resultant reflected light rays travel the same optical path to impinge upon the sample S. Light transmitted through the sample S is detected by the light-receiving device 23 through the analyzers 19.

The control unit 25 analyzes the birefringence characteristics of the sample S by identifying the state of polarization at the part of the sample S when the linearly polarized light is transmitted from data based on the azimuth angles of the linearly polarized light rays $E_1$ to $E_n$ and the output signal from the light-receiving device 23.

In the present mode for carrying out the invention, as a result of the rotation of the polygon mirror 17, polarized light rays from the light source sequentially impinge upon the sample, which makes it possible to conduct measurement based on the rotary compensator method with the states of polarization switched at a high speed.

(Fourth Mode for Carrying Out the Invention)

A high-speed polarizing device and a birefringence measuring apparatus in a fourth mode for carrying out the invention will now be described.

Figure 5:
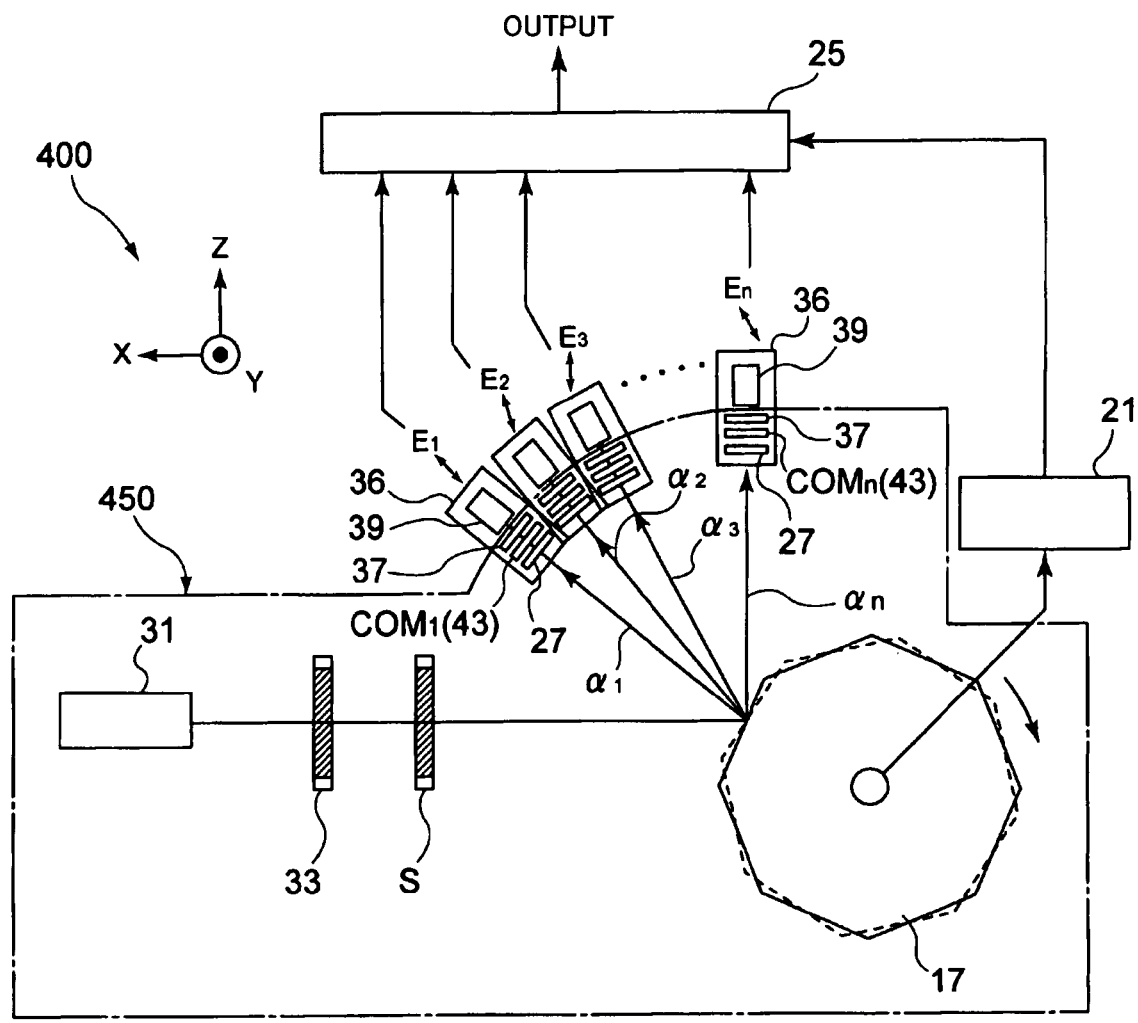
FIG. 5 is a block diagram showing a high-speed polarizing device and a birefringence measuring apparatus in a fourth mode for carrying out the invention.

FIG. 5 is a block diagram showing a high-speed polarizing device and a birefringence measuring apparatus in the present mode for carrying out the invention. A high-speed polarizing device 450 of the present mode for carrying out the invention includes a single light source 31, a polarizer 33 on which light from the light source 31 impinges and which emits linearly polarized light (inspection light) in a certain predetermined direction, a polygon mirror 17 which is a rotary reflection mirror to which the inspection light from the polarizer 33 is introduced after being transmitted through a sample S, and a plurality of polarization direction splitting units 36 which receive reflected light from the polygon mirror 17 and each of which changes the polarization direction into a particular direction. The polarization direction splitting units 36 are disposed on an arc that is centered at the polygon mirror 17.

The units include a first compensator 27 for compensating a change in the state of polarization caused by the polygon mirror 17, second compensators 43 (COM₁ to COMₙ), an analyzer 37 having a predetermined polarization direction, and a light-receiving device 39 for receiving light output by the analyzer 37.

A birefringence measuring apparatus 400 utilizing the high-speed polarizing device 450 includes a rotation detecting unit 21 for detecting and outputting a rotation angle signal from the polygon mirror 17 which is rotating and a control unit 25 for controlling various parts including the polygon mirror 17. The apparatus measures polarization characteristics of a sample S disposed midway the optical path from the polarizer 33 to the polygon mirror 17 based on the quantity of light obtained by the light-receiving devices 39. The birefringence measuring apparatus 400 measures optical characteristics based on the rotary compensator method.

The effects of the present mode for carrying out the invention having the above-described configuration will now be described.

The state of polarization of inspection light emitted by the light source 31 is changed by the polarizer 33, and the light is converted into linearly polarized light in a particular azimuth angle to impinge upon a part of the sample S. The inspection light transmitted through the sample S impinges upon the polygon mirror 17. The inspection light reflected by the polygon mirror 17 is detected by the polarization direction splitting units 36 which are disposed on the plurality of radial optical paths $α_1$ to $α_n$ at equal angular intervals.

The influence of the reflection at the polygon mirror 17 on the inspection light rays is canceled (compensated) by the first compensators 27 provided in the respective polarization direction splitting units 36. Thereafter, the state of polarization of is further changed by the second compensator 43, and only inspection light rays in states of polarization allowed to pass through the analyzers 37 impinge upon the light-receiving devices 39. The light incident on the light-receiving devices 39 as thus described results in the output of a detection signal in accordance with the quantity of incident light. When the signal is input to the control unit 25, the control unit 25 analyzes the state of birefringence at the irradiated part of the sample S using a predetermined analysis equation (2).

$$I = I_0(2 - \cos2\Psi + 2\sin2\Psi\sin\Delta\sin2C - \cos2\Psi\cos4C + \sin2\Psi\cos\Delta\sin4C)$$
$$= I_0(2 + S_1 - 2S_3\sin2C + S_1\cos4C + S_2\sin4C)$$

Equation 2 where C represents the rotational angle of the compensator, and $S_3$ represents a parameter indicating reflection of light at the sample.

In the present mode for carrying out the invention, inspection light is analyzed at the light-receiving devices 39 at a high speed, which prevents the influence of ambient light and makes it possible to improve the accuracy of measurement. Since only one light source 31 is required, there is no possibility of influence of variations between individual light sources unlike configurations in which a plurality of light sources are required.

(Fifth Mode for Carrying Out the Invention)

A fifth mode for carrying out the invention will now be described.

Figure 6:
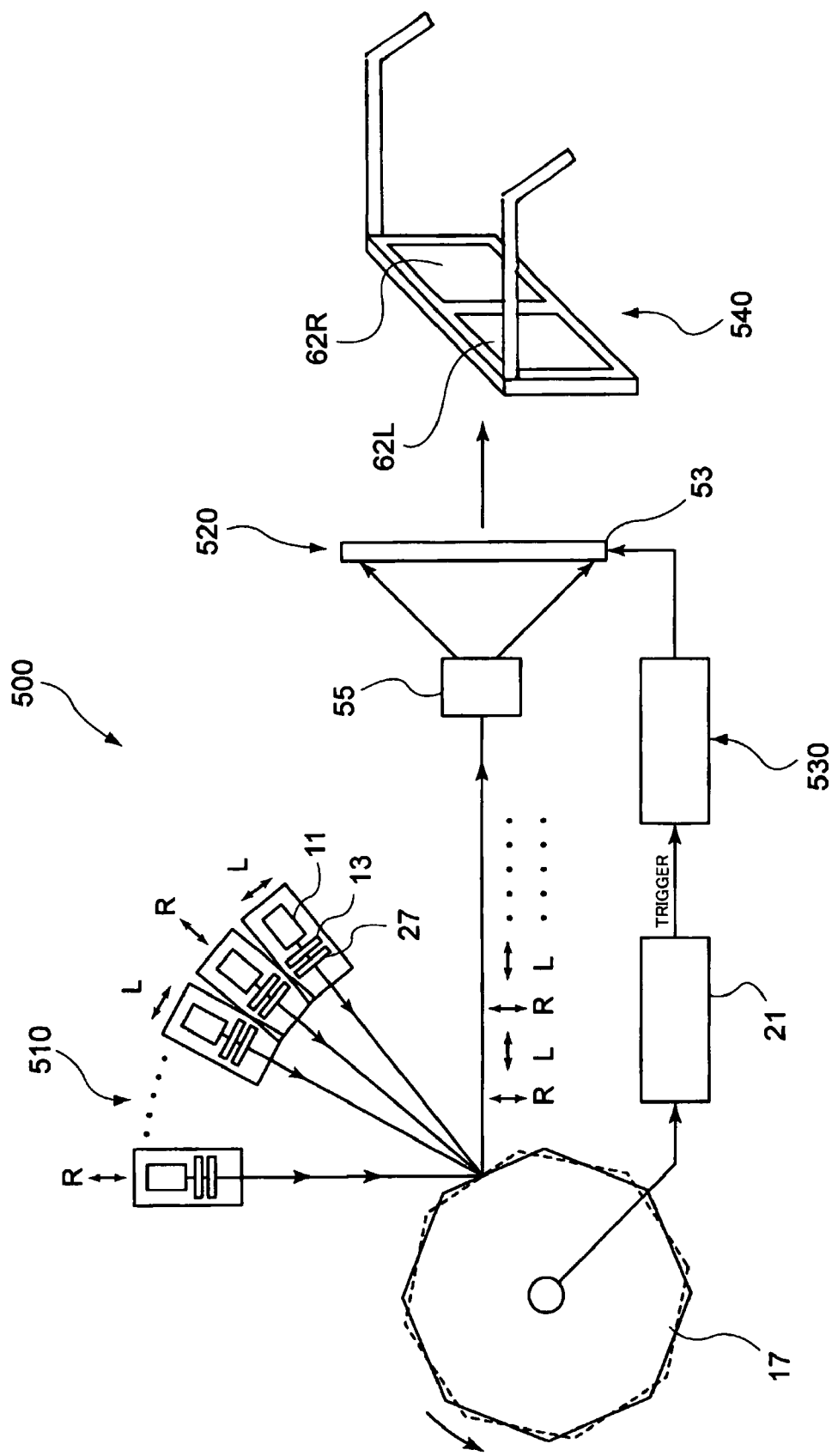
FIG. 6 is a block diagram showing a stereoscopic image display apparatus according to the invention.

FIG. 6 is a block diagram showing a stereoscopic image display apparatus 500 according to the invention.

The stereoscopic image display apparatus 500 of the present mode for carrying out the invention is a display apparatus 5 for displaying a three-dimensional image. Referring to a generation configuration of the apparatus, it includes polarized light emitting unit 510 for repeatedly emitting light rays having polarization directions orthogonal to each other using a high-speed polarizing device as described above, polarization display unit 520 capable of changing the polarization directions throughout a display screen, image signal supplying unit 530 for supplying a parallax image signal for right eye and a parallax image signal for left eye to the polarization display unit 520 in synchronism with a change in the polarization direction of light emitted from the polarized light emitting unit 510 to cause the polarization display unit 520 to display an image; and an eyepiece 540 having a polarizing film for right eye and a polarizing film for left eye having polarization directions orthogonal to each other.

In the present mode for carrying out the invention, the polarized light emitting unit 510 has a configuration in which the polarizers 13 of the high-speed polarizing device 150 shown in FIG. 1 are sequentially arranged in polarization directions orthogonal to each other in order to obtain polarized light rays for right and left eyes of a person. Therefore, reflected output light from the polygon mirror 17 has polarization directions which results in repetitive polarized light rays R and L for the right and left eyes, respectively.

Figure 7:
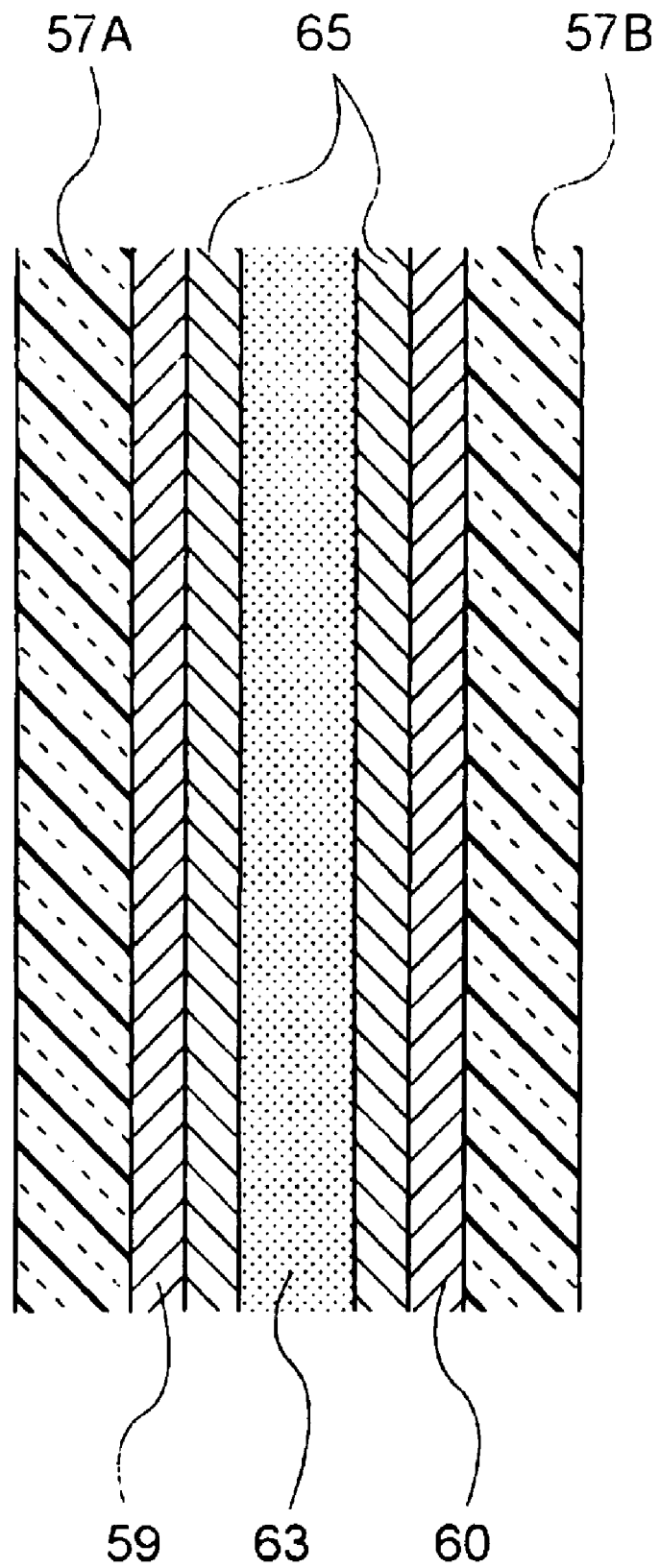
FIG. 7 shows a sectional structure of a liquid crystal panel.
Figure 8:
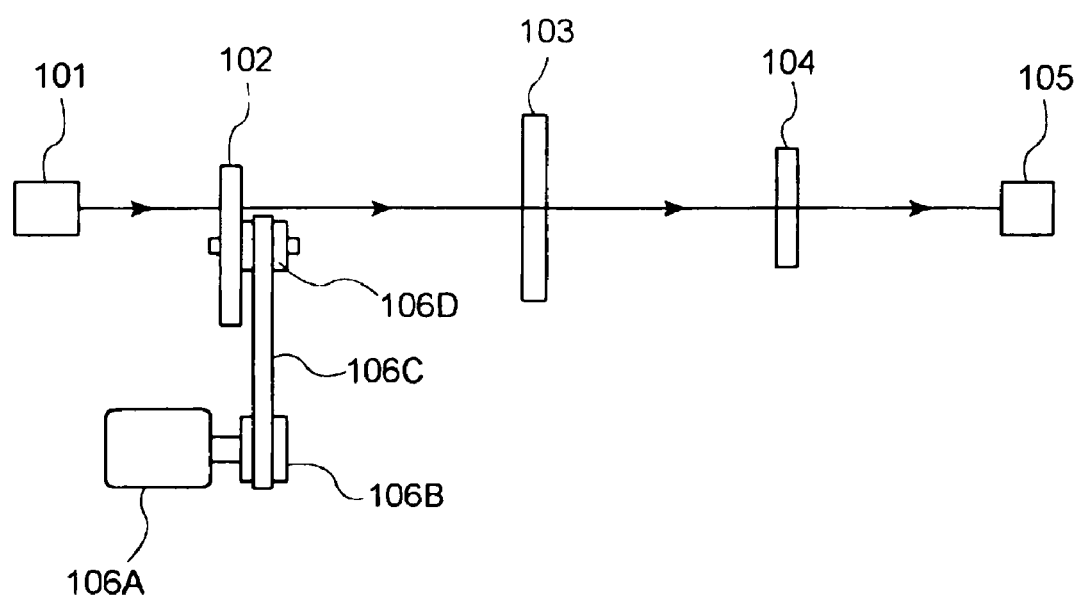
FIG. 8 illustrates the principle of the rotary polarizer method that is one of specific methods of measuring the state of polarization using an ellipsometer according to the related art.
Figure 9:
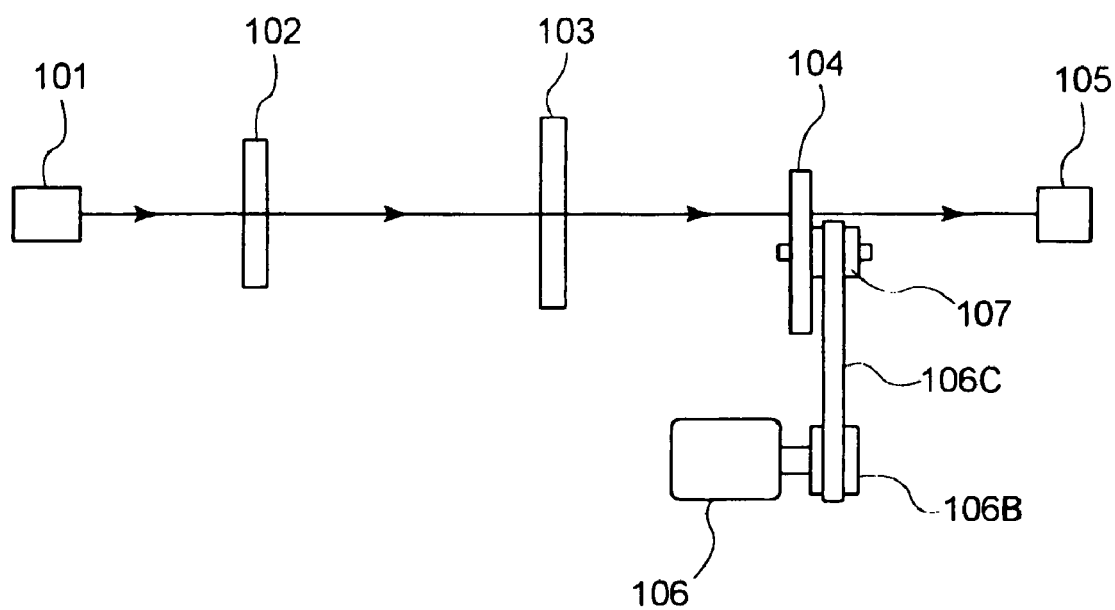
FIG. 9 illustrates the principle of the rotary analyzer method that is one of specific methods of measuring the state of polarization using an ellipsometer according to the related art.
Figure 10A:
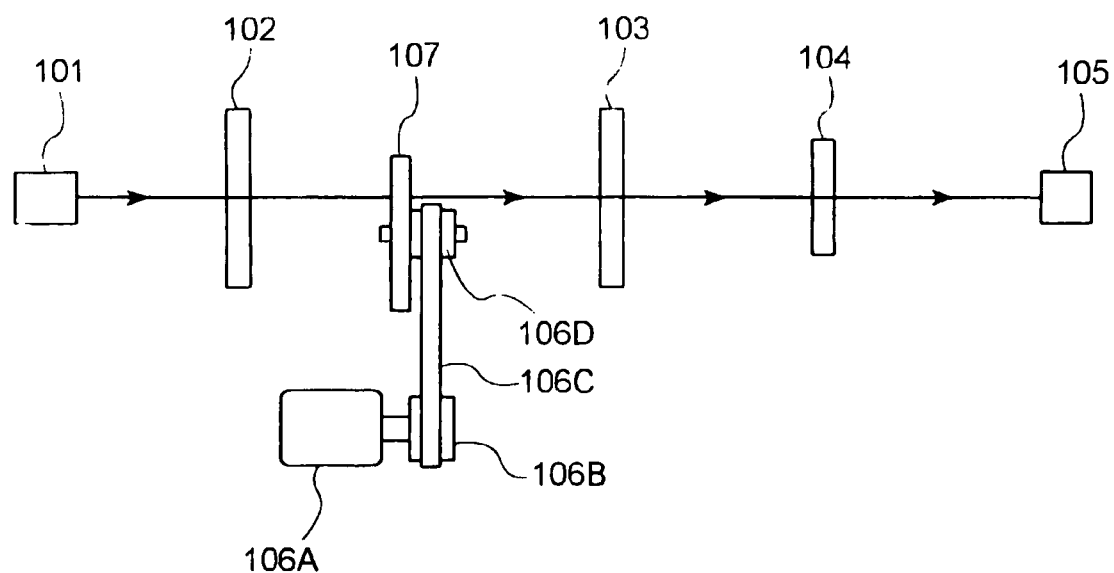
FIG. 10A illustrates the principle of the rotary compensator method that is one of specific methods of measuring the state of polarization using an ellipsometer according to the related art.
Figure 10B:
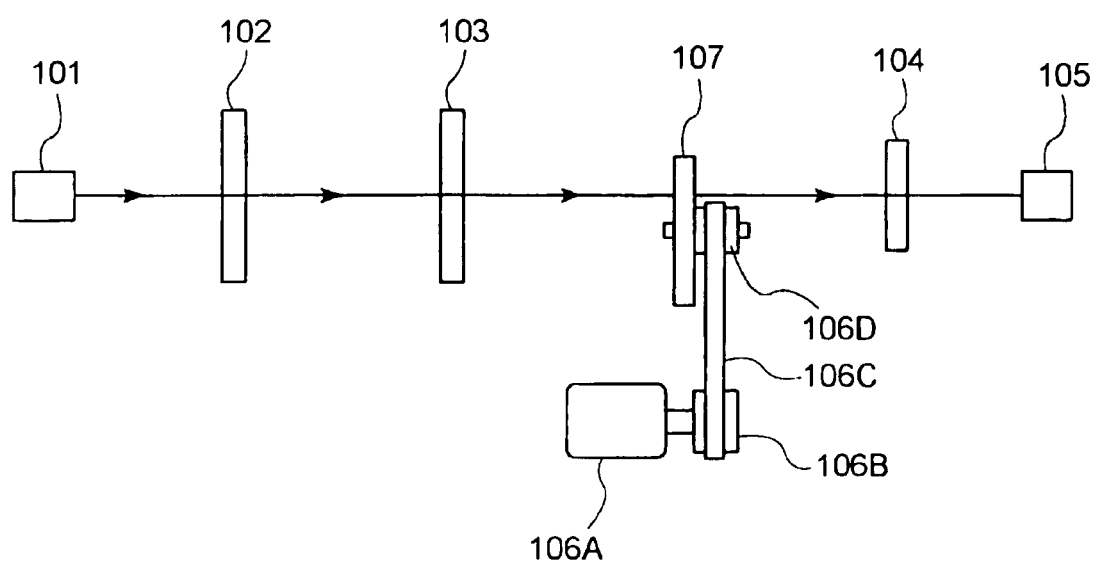
FIG. 10B illustrates the principle of a modification of the method.

The polarization display unit 520 receives the reflected output light from the polygon mirror 17 and displays images on a display 53 such as a two-dimensional transmissive screen. It displays images based on image signals output by an image output unit 530 as the image signal supplying unit 530. A surface illumination light-transforming unit 55 which scans or spreads the reflected output light from the polygon mirror 17 for surface illumination is provided behind the display 53 in the optical path, and the unit serves as a backlight for the display 53. The image output unit 530 alternately outputs parallax image signals for the right eye and parallax image signals for the left eye to the display 53 in accordance with the angle of rotation of the polygon mirror 17 or in synchronism with the polarization directions. The display 53 is a liquid crystal display having a sectional structure as shown in FIG. 7 by way of example. It displays images for the right eye at the timing when the polarized light rays R for the right eyes are radiated and displays images for the left eye at the timing when the polarized light rays L for the left eye are radiated. The display 53 may be a reflective screen.

Referring to the display 53 which is a transmissive screen, transparent electrode layers 59 and 60 such as LTOs are disposed inside glass substrates 57 and 58, and a liquid crystal layer 63 is formed between the transparent electrode layers 59 and 60. Alignment layers 65 are formed on both external sides of the liquid crystal layer 63.

The eyepiece 540 has a polarizing film 62R for the right eye and a polarizing film 62L for the left eye. When a person views the display 53 on which images for the right eyes and left eyes are alternately displayed at a high speed through the eyepiece 540, the parallax images for the right eye are viewed by the right eye with the polarized light rays R for the right eye serving as a backlight, and the parallax images for the left eye are viewed by the left eye with the polarized light rays L for the left eye serving as a backlight. Thus, the images will be perceived as stereoscopic images. The analyzer 19 of the high-speed polarizing device 100 shown in FIG. 1 corresponds to the polarizing film 62R for the right eye and the polarizing film 62L for the left eye.

In this mode for carrying out the invention, since the parallax images for the right eye and the parallax image for the left eye are switched at a high speed, three-dimensional images having high visual quality can be produced even on a large screen. Thus, stereoscopic images of high quality can be displayed.

Instead of the above-described configuration, for example, a configuration may be employed, in which the signals from the image output unit 530 are transmitted to each unit of the polarized light emitting unit 510 to output parallax images for the right eye and parallax images for the left eye from the unit and in which the images are displayed on the screen by switching them at a high speed with the polygon mirror 17.

EMBODIMENT 1

Embodiments of the invention will now be described.

The birefringence of an optical film was measured according to the rotary polarizer method using the birefringence measuring apparatus 100 shown in FIG. 1. Nine laser generators (having a wavelength of 633 nm) were used as the light sources 11, and a polarizer 13 was disposed immediately behind each light source 11, the polarization directions of each pair of adjacent polarizers being at an angle of 20° to each other to define a total angular range from 0° to 160°. A λ/4 plate was used as the first compensator 27, and the in-plane angle of the first compensator 27 was adjusted to compensate for changes in polarization attributable to reflection at the polygon mirror 17. The in-plane angle of the first compensator 27 was adjusted by fixing the polygon mirror 17 at the angle at which light from a particular light source impinged upon the light-receiving device 23 and rotating the analyzer 19 with the sample S removed to measure the state of polarization of the light incident upon the analyzer 19. Then, the angle of the first compensator 27 was adjusted such that the light incident upon the analyzer 19 would become linearly polarized light in agreement with the direction of the polarizer 13 provided immediately behind the light source 11. Such adjustment was carried out for all first compensators 27 behind the light sources 11.

The polygon mirror 17 used was a type having eight surfaces, and it was rotated at 20 rps. Linearly polarized light rays in an angular range from 0 to 180° repeatedly impinged upon the sample S 160 times per second. When the polarizer is rotated at 20 rps according to the method in the related art, linearly polarized light rays in an angular range from 0 to 180° repeatedly impinge upon the sample S 40 times per second. The inventive method resulted in a measuring speed four times higher than that in the related art.

The intensity of light from the light sources 11 transmitted through the sample S and the analyzer 19 was acquired by matching the angle of rotation of the polygon mirror 17 and the timing at which optical intensity data was acquired from the light-receiving device 23, and the resultant data was saved in a computer. The birefringence characteristics of the sample S were measured by analyzing the data.

In this case, birefringence characteristics could be measured at the same level of accuracy as the related art at a measuring speed four times higher than the related art.

EMBODIMENT 2

The birefringence of an optical film was measured according to the rotary analyzer method using the birefringence measuring apparatus 200 shown in FIG. 3. A single laser generator (633 nm) was used as the light source 31, and a polarizer 33 having a transmission axis direction at 45° was disposed immediately behind the same. A sample S was placed behind the polarizer 33, and light transmitted through the sample S was sequentially projected along nine optical axes $\alpha_1$ to $\alpha_n$ by the polygon mirror 17 having eight surfaces. The analyzers 37 were disposed immediately before nine light-receiving devices 39 on the optical axes. The transmission axis directions of each pair of adjacent analyzers 37 were at an angle of 20° to each other to define a total angular range from 0° to 160°. The first compensator 27 was disposed immediately before each analyzer 37. A λ/4 plate was used as the first compensator 27, and the in-plane angle of the first compensator 27 was adjusted to compensate for changes in polarization attributable to reflection at the polygon mirror 17. The in-plane angle of the first compensator 27 was adjusted by fixing the polygon mirror 17 at the angle at which light from the light source 31 impinged upon a particular light-receiving device 39 and rotating the analyzer 37 with the sample S removed to measure the state of polarization of the light incident upon the analyzer 37. Then, the in-plane angle of the first compensator 27 was adjusted such that the light incident upon the analyzer 37 would agree with the polarization direction of the polarizer 33 provided immediately behind the light source 31. Such adjustment was carried out for all first compensators 27 provided before the light-receiving devices 39.

The polygon mirror 17 used was a type having eight surfaces, and it was rotated at a speed of 20 rps. The measurement of the state of polarization of light emitted from the sample S at this time was equivalent to measurement carried out by repeatedly changing the transmission axis direction of the analyzer 37 160 times per second, one unit of measurement being the angular range from 0 to 180°. When the polarizer is rotated at 20 rps according to the method in the related art, linearly polarized light rays in an angular range from 0 to 180° repeatedly impinge upon the sample S 40 times per second. The inventive method resulted in a measuring speed four times higher than that in the related art.

The intensity of light from the light source 31 transmitted through the sample S and the analyzer 37 was acquired by matching the angle of rotation of the polygon mirror 17 and the timing at which optical intensity data was acquired from the light-receiving devices 39, and the resultant data was saved in a computer. The birefringence characteristics of the sample S were measured by analyzing the data.

In this case, birefringence characteristics could be measured at the same level of accuracy as the related art at a measuring speed four times higher than the related art.

EMBODIMENT 3

The birefringence of an optical film was measured according to the rotary compensator method using the birefringence measuring apparatus 300 shown in FIG. 4.

Nine laser generators (having a wavelength of 633 nm) were used as the light sources 11, and a polarizer 41 having a transmission axis direction of 45° was disposed immediately behind each light source 11. A λ/4 plate was used as the second compensator 43 to be disposed immediately behind each polarizer 41, and the plates were disposed such that each pair of adjacent plates were at an angle of 20° to each other to define a total angular range from 0° to 160°. A λ/4 plate was used as the first compensator 27 to be disposed immediately behind each of the second compensators 43, and the in-plane angle of the first compensator 27 was adjusted to compensate for changes in polarization attributable to reflection at the polygon mirror 17. The angle of the first compensator 27 was adjusted by fixing the polygon mirror 17 at the angle at which light from a particular light source 11 impinged upon the light-receiving device 23 and rotating the analyzer 19 with the second compensators 43 and the sample S removed to measure the state of polarization of the light incident upon the analyzer 19. Then, the angle of the first compensator 27 was adjusted such that the light incident upon the analyzer 19 would become linearly polarized light at an azimuth angle of 45°. Such adjustment was carried out for all first compensators 27 behind the light sources 11.

The polygon mirror 17 used was a type having eight surfaces, and it was rotated at 20 rps to perform measurement of the sample S. Light corresponding to the rotation of the second compensator 27 at the angle of 0 to 180° repeatedly impinged upon the sample S 160 times per second. When the second compensator 27 is rotated at 20 rps according to the method in the related art, light corresponding to the rotation at the angle of 0 to 180° repeatedly impinge upon the sample S 40 times per second. The inventive method resulted in a measuring speed four times higher than that in the related art.

The intensity of light from the light sources 11 transmitted through the sample S and the analyzer 19 was acquired by matching the angle of rotation of the polygon mirror 17 and the timing at which optical intensity data was acquired from the light-receiving device 23, and the resultant data was saved in a computer. The birefringence characteristics of the sample S were measured by analyzing the data.

In this case, birefringence characteristics could be measured at the same level of accuracy as the related art at a measuring speed four times higher than the related art.

This application is based on Japanese Patent application JP 2006-183348, filed Jul. 3, 2006, the entire content of which is hereby incorporated by reference, the same as if set forth at length.

What is claimed is:

1. A polarizing device for continuously generating light rays in different states of polarization, comprising:
   a plurality of polarized light radiating units for radiating polarized light rays each of which is polarized in a particular direction;
   a rotary reflector for receiving light rays emitted by the plurality of polarized light radiating units while being rotated and for outputting reflected light in a certain direction; and
   an analyzer disposed midway an optical path of the reflected light from the rotary reflector to set a polarization direction of the reflected light in a certain direction, wherein:
   each of the polarized light radiating units includes a light source, a polarizer for setting a polarization direction of light from the light source, and a first compensator for compensating for a change in a state of polarization attributable to the rotary reflector; and
   the plurality of polarized light radiating units are disposed in a radial arrangement that is centered at the rotary reflector.

2. The polarizing device according to claim 1, wherein each of the plurality of polarized light radiating units includes a polarizer, the polarization direction of the polarizer being different between the polarized light radiating units.

3. The polarizing device according to claim 1, wherein each of the plurality of polarized light radiating units includes a polarizer having a polarization direction which is a certain direction and a second compensator, the retardation of the compensator being different between the polarized light radiating units.

4. A birefringence measuring apparatus comprising:
   the polarizing device according to claim 1; and
   a light-receiving device for receiving light output from the analyzer, wherein polarization characteristics at a sample disposed midway an optical path from the rotary reflector to the analyzer are measured based on a received light quantity obtained by the light-receiving device.

5. A stereoscopic image display apparatus comprising:

polarized light emitting unit for repeatedly emitting light rays having polarization directions orthogonal to each other using the polarizing device according to claim 1;

polarization display unit capable of changing polarization directions throughout a display screen;

image signal supplying unit for supplying a parallax image signal for right eye and a parallax image signal for left eye to the polarization display unit in synchronism with a change in the polarization direction of light emitted from the polarized light emitting unit to cause the polarization display unit to display an image; and an eyepiece having a polarizing film for right eye and a polarizing film for left eye having polarization directions orthogonal to each other.

* * * * *